United States Patent
Yun et al.

(10) Patent No.: US 9,600,002 B2
(45) Date of Patent: Mar. 21, 2017

(54) METHOD AND ELECTRONIC DEVICE FOR CONTROLLING DRIVING CONDITION BASED ON OPERATING STATE

(71) Applicant: Samsung Electronics Co., Ltd, Gyeonggi-do (KR)

(72) Inventors: Chuleun Yun, Gyeonggi-do (KR); Chulwoo Park, Gyeonggi-do (KR); Kwangsub Lee, Gyeonggi-do (KR); Seyoung Jang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 521 days.

(21) Appl. No.: 14/088,228

(22) Filed: Nov. 22, 2013

(65) Prior Publication Data

US 2014/0139024 A1 May 22, 2014

(30) Foreign Application Priority Data

Nov. 22, 2012 (KR) ........................ 10-2012-0132736

(51) Int. Cl.
*H02J 3/14* (2006.01)
*G05F 1/10* (2006.01)
*G06F 1/32* (2006.01)

(52) U.S. Cl.
CPC .............. *G05F 1/10* (2013.01); *G06F 1/324* (2013.01); *G06F 1/3206* (2013.01); *G06F 1/3296* (2013.01); *Y02B 60/1217* (2013.01); *Y02B 60/1285* (2013.01); *Y02B 60/32* (2013.01); *Y10T 307/406* (2015.04)

(58) Field of Classification Search
CPC ... G05F 3/04; G05F 1/12; G05F 1/577; G05F 1/625; G05F 1/10; G05F 1/46; G05F 1/462; G05F 1/463; G05F 1/468; G05F 1/56; G05F 1/67; G05F 3/08
USPC .......................................................... 307/31
See application file for complete search history.

(56) References Cited

U.S. PATENT DOCUMENTS

| | | | |
|---|---|---|---|
| 2004/0078607 A1* | 4/2004 | Feng | G06F 1/3203 713/300 |
| 2004/0098631 A1 | 5/2004 | Terrell, II | |
| 2004/0215986 A1 | 10/2004 | Shakkarwar | |
| 2006/0136764 A1 | 6/2006 | Munguia | |
| 2008/0055119 A1 | 3/2008 | Sadowski et al. | |

(Continued)

FOREIGN PATENT DOCUMENTS

EP 2 490 102 A2 8/2012

OTHER PUBLICATIONS

Extended European Search Report dated Jul. 25, 2016 in connection with European Application No. 13193432.5, 11 pages.

*Primary Examiner* — Jared Fureman
*Assistant Examiner* — Esayas Yeshaw

(57) ABSTRACT

An electronic device controls a driving condition based on an operating state. The device includes a function block, a function monitoring agent, and a driving control module. The function block includes a plurality of function modules. The function monitoring agent is configured to identify one or more activated function modules among the function modules in the function block. The driving control module is configured to determine the driving condition required for an operation of the activated function modules, and based on the determined driving condition, to drive the activated function modules.

14 Claims, 5 Drawing Sheets

(56) References Cited

U.S. PATENT DOCUMENTS

| | | | |
|---|---|---|---|
| 2008/0307240 A1* | 12/2008 | Dahan | G06F 1/06 713/320 |
| 2009/0199019 A1* | 8/2009 | Hongisto | G06F 1/3203 713/300 |
| 2010/0287393 A1* | 11/2010 | Burchard | G06F 1/3296 713/322 |
| 2011/0080202 A1 | 4/2011 | Moore et al. | |
| 2011/0175711 A1* | 7/2011 | Kuo | G06F 1/266 340/12.32 |
| 2011/0320795 A1 | 12/2011 | Bosisio et al. | |
| 2013/0015904 A1* | 1/2013 | Priel | G06F 1/3203 327/419 |
| 2014/0111315 A1* | 4/2014 | Geerlings | G07C 9/00309 340/12.5 |

\* cited by examiner

METHOD AND ELECTRONIC DEVICE FOR CONTROLLING DRIVING CONDITION BASED ON OPERATING STATE

CROSS-REFERENCE TO RELATED APPLICATION(S) AND CLAIM OF PRIORITY

The present application is related to and claims the benefit under 35 U.S.C. §119(a) of a Korean patent application No. 10-2012-0132736 filed on Nov. 22, 2012 in the Korean Intellectual Property Office, the entire disclosure of which is hereby incorporated by reference.

TECHNICAL FIELD

The present disclosure relates to a driving control of an electronic device and, more particularly, to a technique to determine a driving condition of a control unit depending on an operating state of an electronic device and perform a driving control on the basis of the driving condition.

BACKGROUND

Nowadays a great variety of electronic devices, e.g., mobile communication devices, are increasingly popularized due to their high usability and good portability. These mobile devices have many helpful functions in addition to their traditional inherent functions such as a call function. For example, conventional mobile devices may have a digital music player function, a digital camera function, a web access function, a mobile game function, and the like.

Meanwhile, conventional mobile devices contain therein highly integrated components in order to support various functions while maintaining smaller and thinner dimensions. However, high integration of components may inevitably and unfavorably cause a reduction in space for heat dissipation. Namely, a reduced space due to smaller and thinner dimensions may conflict with a need of a sufficient space for better heat dissipation.

SUMMARY

To address the above-discussed deficiencies, it is a primary object is to provide a method and electronic device for determining a driving condition of a control unit depending on an operating state of actually running function modules in the control unit and also realizing an optimal operation of the control unit on the basis of the determined driving condition in order to improve heat dissipation and attain efficient power consumption.

An embodiment in this disclosure may provide a method for controlling a driving condition based on an operating state. The method may include identifying one or more activated function modules among function modules in a control unit, determining the driving condition required for an operation of the activated function modules, and based on the determined driving condition, driving the activated function modules.

Another embodiment in this disclosure may provide an electronic device for controlling a driving condition based on an operating state. The device may include a function block, a function monitoring agent, and a driving control module. The function block may include a plurality of function modules. The function monitoring agent may be configured to identify one or more activated function modules among the function modules in the function block. The driving control module may be configured to determine the driving condition required for an operation of the activated function modules, and based on the determined driving condition, to drive the activated function modules.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a driving condition" includes reference to one or more of such driving conditions.

Figure 1:
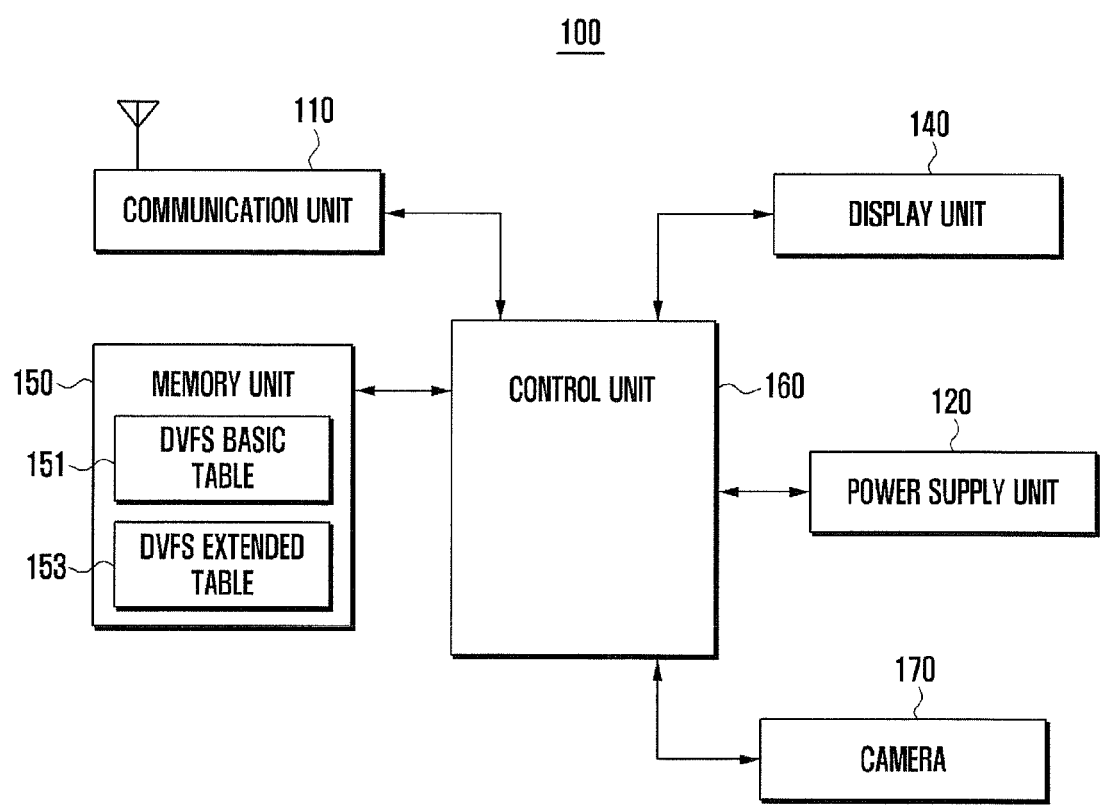
FIG. 1 is a block diagram illustrating an electronic device in accordance with an embodiment of the present disclosure.

FIG. 1 is a block diagram illustrating an electronic device in accordance with an embodiment of the present disclosure.

Referring to FIG. 1, the device 100 can include a communication unit 110, a power supply unit 120, a display unit 140, a memory unit 150, and a control unit 160. Optionally, depending on whether to support an image capture function, the device 100 can further include a camera 170.

In a process of driving the control unit 160, the device 100 can check an actual operating state of function modules in the control unit 160 and, based thereon, determine a driving condition of the control unit 160. Then, by driving the control unit 160 according to the determined driving condition, the device 100 can operate optimally based on actually running elements. As a result, the device 100 can attain efficient power consumption and improve heat dissipation.

Specifically, the control unit 160 can detect an actual operating state of function modules equipped therein to drive respective elements of the device 100 such as the communication unit 110, the display unit 140 and the camera 170. Then the control unit 160 can calculate an optimal driving condition such as an operating frequency and voltage, depending on the detected operating state, and operate the function modules on the basis of the calculated driving condition. The control unit 160 will be fully described below with reference to FIG. 2.

The communication unit 110 can be formed of a communication module chip and disposed in the device 100 to support a communication function of the device 100. In case where the device 100 supports no communication function, the communication unit 110 can be removed from the device 100. The communication unit 110 can be activated in response to a user's request, a predefined schedule, or any request from external entities. The communication unit 110 can operate based on a specific voltage and operating frequency for driving the communication module chip under the control of the control unit 160. Namely, the control unit 160 can have a particular function module for driving the communication module chip of the communication unit 110, and control the function module to operate at a specific voltage and operating frequency. Further, depending on an operating state of the function module used for the communication unit 110, such a voltage and frequency can be adaptively varied.

In other words, a specific voltage and a specific operating frequency both of which are determined for actually driving the communication unit 110 may be not included in a driving condition of the control unit 160 when the communication unit 110 does not operate, but involved in calculation of a driving condition when the communication unit 110 is actually running. Compared to a typical driving condition determined regardless of whether the control unit 160 is actually driving the communication unit 110, the control unit 160 disclosed herein can determine a driving condition in consideration for only function modules associated with driving the communication unit 110. As a result, the control unit 160 can perform a driving process using a relatively lower voltage and operating frequency, thus reducing unnecessary power consumption and resultant undue heat generation. Meanwhile, the above-discussed communication module chip can include a broadcast receiving module, a short-range communication module, and the like as well as a normal communication chip for supporting a call function and a data communication function.

The power supply unit 120 can be configured to supply electric power required for the operation of the device 100. Specifically, the power supply unit 120 can supply electric power of a specific voltage to respective elements of the device 100 under the control of the control unit 160. Particularly, the power supply unit 120 can supply, to the control unit 160, electric power of a specific voltage determined depending on an operating state of function modules in the control unit 160. Namely, by providing a specific voltage required for actually running function modules, the control unit 160 can be supplied with electric power of a relatively lower voltage depending on situations.

The display unit 140 can display a great variety of screens required for the operation of the device 100. For example, the display unit 140 can offer an idle screen, a menu screen, a file play screen, a file search screen, a broadcast receiving screen, a web access screen, or the like in response to a user's selection or according to a predefined schedule. The display unit 140 can be formed of a touch screen having an overlap structure of a touch panel and a display panel, thus supporting an input function as well as a display function.

The display unit 140 can operate with a specific resolution under the control of the control unit 160 in response to a user's request or according to a predefined schedule or by the activation of a specific element, e.g., the camera 170. For example, the display unit 140 can selectively output a screen of 1080-series resolution or a screen of 720-series resolution, depending on situations. In this case, the control unit 160 can check an operating state of a function module for driving the display unit 140 and then, depending on the checked operating state, determine a driving condition to be applied to the display unit 140. For example, the control unit 160 can differently determine a driving condition of a function module assigned to drive the display unit 140, depending on an operating state such as turning off the display unit 140, outputting a screen of the first resolution, or outputting a screen of the second resolution which is different from the first resolution.

A driving condition determined for driving the display unit 140 can be compared with those of function modules which currently run in the control unit 160 to drive the device 100. Then, based on comparison results, the control unit 160 can change its own driving condition. For example, if a driving condition of a function module for currently driving the display unit 140 which has been just activated is higher than driving conditions of function modules which have been running while the display unit 140 has been in an inactivated state, the control unit 160 can operate based on at least one of an operating frequency and voltage which are determined as driving conditions for driving the display unit 140. In contrast, if a driving condition of a function module for currently driving the display unit 140 is lower than driving conditions of function modules which have been running, the control unit 160 can maintain a previous operating state without changing a driving condition. Alternatively, the control unit 160 can apply a driving condition for driving the display unit 140 to driving conditions of previous function modules, thereby calculate modified driving conditions, and then operate based on calculation results.

Therefore, depending on whether the display unit 140 is in a turn-off state, in a state of supporting the first resolution, or in a state of supporting the second resolution, the control unit 160 can differently determine a driving condition and then, based on the determined driving condition, perform an optimal driving operation. Two types of resolutions given above are exemplary only and not to be considered as a limitation of this disclosure. Alternatively, more various types of resolutions can be used to determine a driving condition.

Additionally, the resolution of the display unit 140 can be changed when the camera 170 is driven. In this case, the control unit 160 can modify a driving condition for driving the display unit 140 together with driving the camera 170, and then join the modified driving condition in determining a driving condition of the control unit 160. Further, if the resolution of the display unit 140 is changed in response to a turn-off of the camera 170, the control unit 160 can modify a driving condition to meet the changed resolution of the display unit 140, and then join the modified driving condition in determining a driving condition of the control unit 160. As discussed hereinbefore, the control unit 160 which have a plurality of function modules to drive respective elements of the device 100 can check, in operating environments, an operating state of any actually running function module among the function modules. Then, based on the operating state, the control unit 160 can determine a driving condition and perform an optimal driving operation.

The memory unit 150 can store a great variety of programs associated with the operation of the device 100. Namely, the memory unit 150 can store an operating system required for the operation of the device 100, and a particular program associated with a specific user function, e.g., a camera operating program, a communication supporting program, a broadcast reception supporting program, and the like. The camera operating program can be optionally used in case the device 100 supports a camera function. Particularly, the memory unit 150 can store a Dynamic Voltage and Frequency Scaling (DVFS) basic table 151 and a DVFS extended table 153.

The DVFS basic table 151 refers to a table that defines a driving condition of the control unit 160 as either the whole driving condition or the highest driving condition of function modules registered in the control unit 160. Particularly, the DVFS basic table 151 can define the driving conditions regardless of whether each of the function modules is in an activated state or in an inactivated state.

The DVFS extended table 153 refers to a table that defines a driving condition of the control unit 160 on the basis of an operating state of function modules. Namely, the DVFS extended table 153 can define a driving condition including at least one of a voltage and an operating frequency, depending on activated function modules only among all the function modules in the control unit 160. Therefore, the DVFS extended table 153 can have various tables which respectively correspond to different combinations of activated function modules. For example, the control unit 160 can have an ISP function module for driving the camera 170 and a display function module for driving the display unit 140. In this case, the DVFS extended table 153 can have the first table that defines a driving condition of the control unit 160 when the display function module only is activated and the ISP function module is inactivated, and the second table that defines a driving condition of the control unit 160 when both the display function module and the ISP function module (except the other function modules) are activated.

In an embodiment, each of the DVFS basic table 151 and the DVFS extended table 153 can define various voltage values corresponding to different operating frequencies. Once any activated function module is identified and then an operating frequency therefor is determined, a voltage required for driving the activated function module can be determined by looking up the DVFS extended table 153. Meanwhile, the DVFS basic table 151 can be used in case all the function modules are in activated states or in the initial operating state or in a reset state. For example, if any error occurs while the DVFS extended table 153 is applied, the control unit 160 can reset a process and apply first the DVFS basic table 151 until applying again the DVFS extended table 153.

The camera 170 can collect an image such as a still image or a video. Normally the camera 170 can have a lens, an aperture, an aperture driver, a lens adjuster, and the like. Particularly, the camera 170 can be driven by an ISP function module included in the control unit 160. When a request for driving the camera 170 is received, the control unit 160 can activate the ISP function module and drive the camera 170 through the activated ISP function module. In case the ISP function module is in an inactivated state, the control unit 160 can check driving conditions of other function modules which are in an activated state, and then perform a control process for the device 100 by looking up a corresponding table of the DVFS extended table 153. Thereafter, when the ISP function module is changed in an activated state, the control unit 160 can check a driving condition of the ISP function module, compare the checked driving condition with those of the other activated function modules, and then select any other corresponding table of the DVGS extended table 153.

In addition to the above-discussed elements, the device 100 can have any other essential or optional elements such as an input unit, an audio processing unit, and the like.

Figure 2:
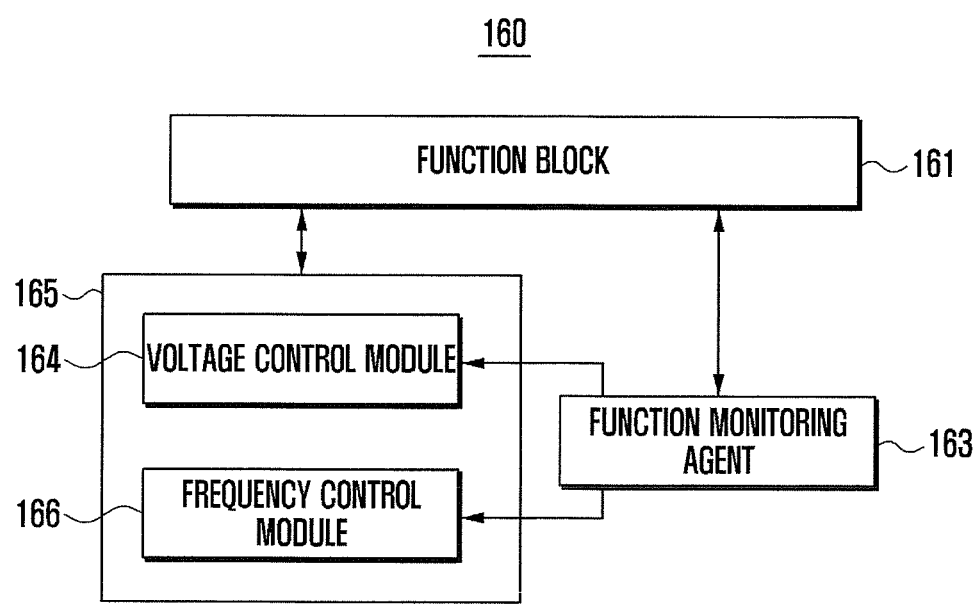
FIG. 2 is a block diagram illustrating a control unit of the electronic device shown in FIG. 1.

FIG. 2 is a block diagram illustrating a control unit of the electronic device shown in FIG. 1.

Referring to FIG. 2, the control unit 160 can include a function block 161, a function monitoring agent 163, and a driving control module 165.

The function block 161 can contain a variety of function modules required for driving the device 100. For example, the function block 161 can have the above-discussed ISP function module, a bus function module for signal transmission in the device 100, a memory function module for access to the memory unit 150, a display function module for driving the display unit 140, a communication function module for driving the communication unit 110, an input function module for driving the input unit, a touch screen function module for supporting the function of a touch screen, and an audio processing function module for driving an audio processing unit. Each of the above function modules contained in the function block 161 can perform a particular function at a specific operating frequency (also referred to as a clock rate), using electric power of a specific voltage. Such a function module can be formed of a hardware block in which various physical components are arranged, a software block embedded or called from the memory unit 150, or a combination thereof. Particularly, all the function modules contained in the function block 161 can receive electric power which is supplied through the same power source line. Further, signal distribution of each function module can be performed at a specific operating frequency. For example, as will be described below, the driving control module 165 can select the highest operating frequency and corresponding voltage on the basis of activated function modules only among all the function modules contained in the function block 161 and then, based on the selected operating frequency and voltage, perform the control of power supply and signal distribution.

The function monitoring agent 163 can identify one or more activated function modules among the function modules contained in the function block 161. The function monitoring agent 163 can transmit information about the activated function modules to the driving control module 165. Additionally, the function monitoring agent 163 can recognize a further change in operating states of the function modules and notify it to the driving control module 165. The further change refers to an inactivation of the activated function module and an activation of an inactivated function module.

The driving control module 165 can determine a driving condition required for the operation of the activated function modules and, based on the determined driving condition, drive the activated function modules. To determine the driving condition, the driving control module 165 can detect and select the DVFS extended table 153 from the memory unit 150. For this, the driving control module 165 can include a voltage control module 164 and a frequency control module 166.

The voltage control module 164 can receive information about an operating state of function modules, i.e., information about the activated function modules, from the function monitoring agent 163. Then the voltage control module 164 can determine the highest voltage from among all voltages required by the activated function modules and control the power supply unit 120 to supply electric power to the activated function modules at the highest voltage. Additionally, in case any activated function module that requires the highest voltage becomes inactivated, the voltage control module 164 can receive, from the function monitoring agent 163, a notification of a further change in operating states of the activated function modules and then determine again the driving condition required for the operation of the activated function modules. Alternatively, the voltage control module 164 can calculate a specific voltage required by all the activated function modules and then control the power supply unit 120 to supply electric power to the activated function modules at the specific voltage. Meanwhile, the voltage control module 164 can use the DVFS extended table 153 discussed above. Namely, the voltage control module 164 can determine the highest voltage or calculate any specific voltage by looking up the DVFS extended table 153.

The frequency control module 166 can control an operating frequency of the control unit 160. After receiving information about an operating state of function modules, i.e., information about the activated function modules, from the function monitoring agent 163, the frequency control module 166 can determine the highest frequency from among all frequencies required by the activated function modules and control the power supply unit 120 to supply electric power to the activated function modules at the highest frequency. Additionally, in case any activated function module that requires the highest frequency becomes inactivated, the frequency control module 166 can receive, from the function monitoring agent 163, a notification of a further change in operating states of the activated function modules and then determine again the driving condition (namely, select the next higher operating frequency). Meanwhile, the frequency control module 166 can use the DVFS extended table 153 discussed above. Namely, the frequency control module 166 can determine the highest or the next higher operating frequency by looking up the DVFS extended table 153.

The above-discussed voltage control and frequency control can be performed using the same DVFS extended table 153 or using the respective DVFS extended tables 153. Using the DVFS extended table 153, the driving control module 165 can selectively adjust at least one of a voltage and an operating frequency in case some function modules only are activated. Namely, depending on the kind of and the number of activated function modules, the driving control module 165 can perform a voltage and/or frequency control.

Figure 3:
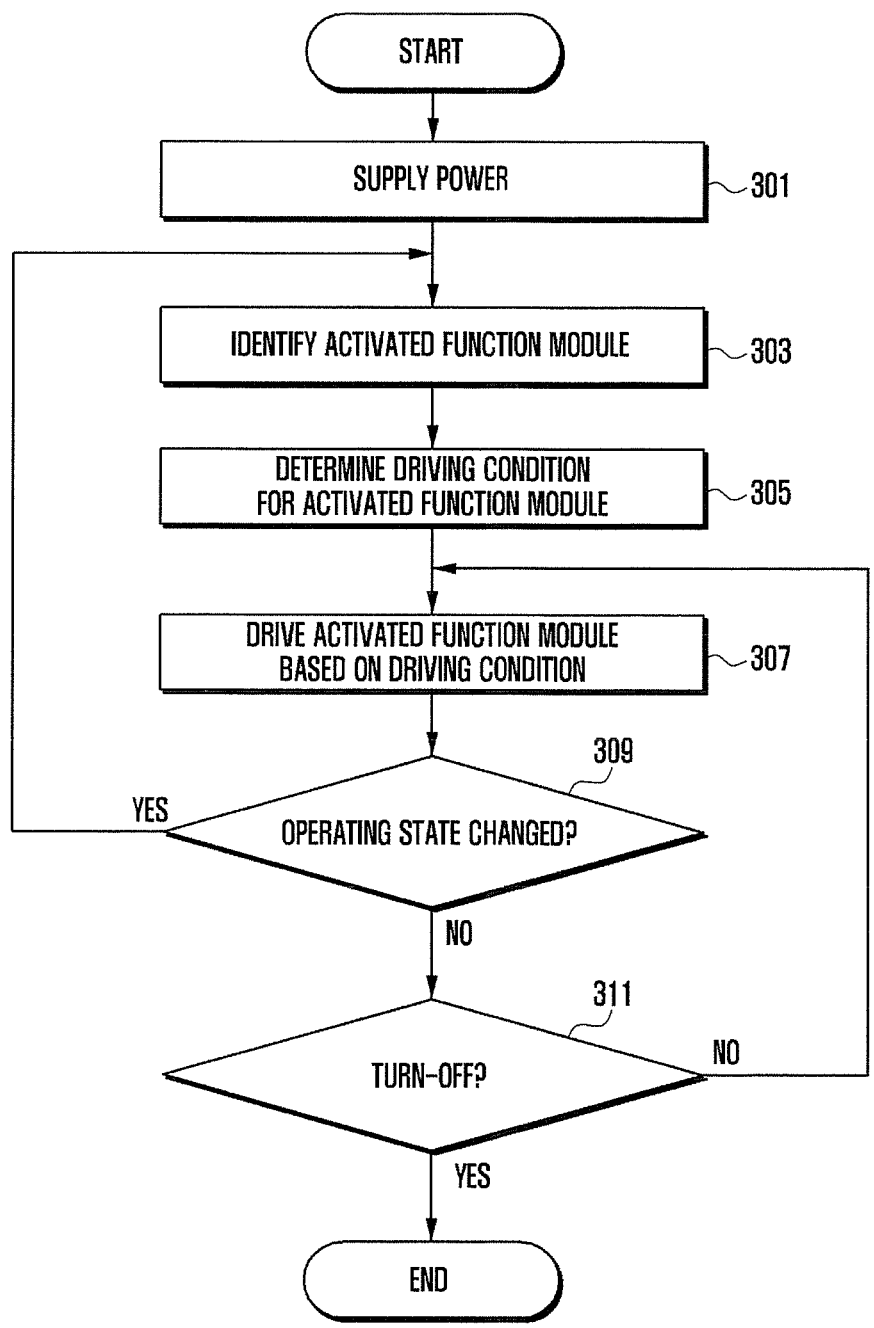
FIG. 3 is a flow diagram illustrating a method for controlling a driving condition based on an operating state in accordance with an embodiment of the present disclosure.

FIG. 3 is a flow diagram illustrating a method for controlling a driving condition based on an operating state in accordance with an embodiment of the present disclosure.

Referring to FIG. 3, at operation 301, the control unit 160 can drive the device 100 using electric power of a predefined voltage at a predefined operating frequency. For example, the control unit 160 can perform a booting process or maintain a sleep mode, using a predefined specific voltage and operating frequency. Thereafter, if some function modules only in the function block 161 are activated in response to any input event or according to predefined schedule, the control unit 160 can identify the activated function modules at operation 303. For example, the control unit 160 can check the type of and the number of the activated function modules.

Then, at operation 305, the control unit 160 can determine a driving condition required for the activated function modules. For example, the control unit 160 can determine the highest voltage and/or highest operating frequency from among all voltages and/or operating frequencies required by the activated function modules by detecting, selecting and looking up the DVFS extended table 153.

Next, at operation 307, based on the determined driving condition and/or the DVFS extended table 153, the control unit 160 can drive the activated function modules. Namely, the control unit 160 can supply electric power to the activated function modules the highest voltage and/or highest operating frequency. In some embodiments, based on the determined voltage or operating frequency and using the DVFS extended table 153, the control unit 160 can adjust an operating frequency or a voltage, respectively.

Next, at operation 309, the control unit 160 can determine whether a further change in operating states of the function modules occurs. Namely, the control unit 160 can recognize an inactivation of the activated function module or an activation of an inactivated function module. If there is state-changed function module, the control unit 160 can return to operation 303.

Next, at operation 311, the control unit 160 can check whether any input event or schedule for turning off the device 100 occurs. If there is no input event or schedule for turn-off of the device 100, the control unit 160 can return to operation 307.

Figure 4:
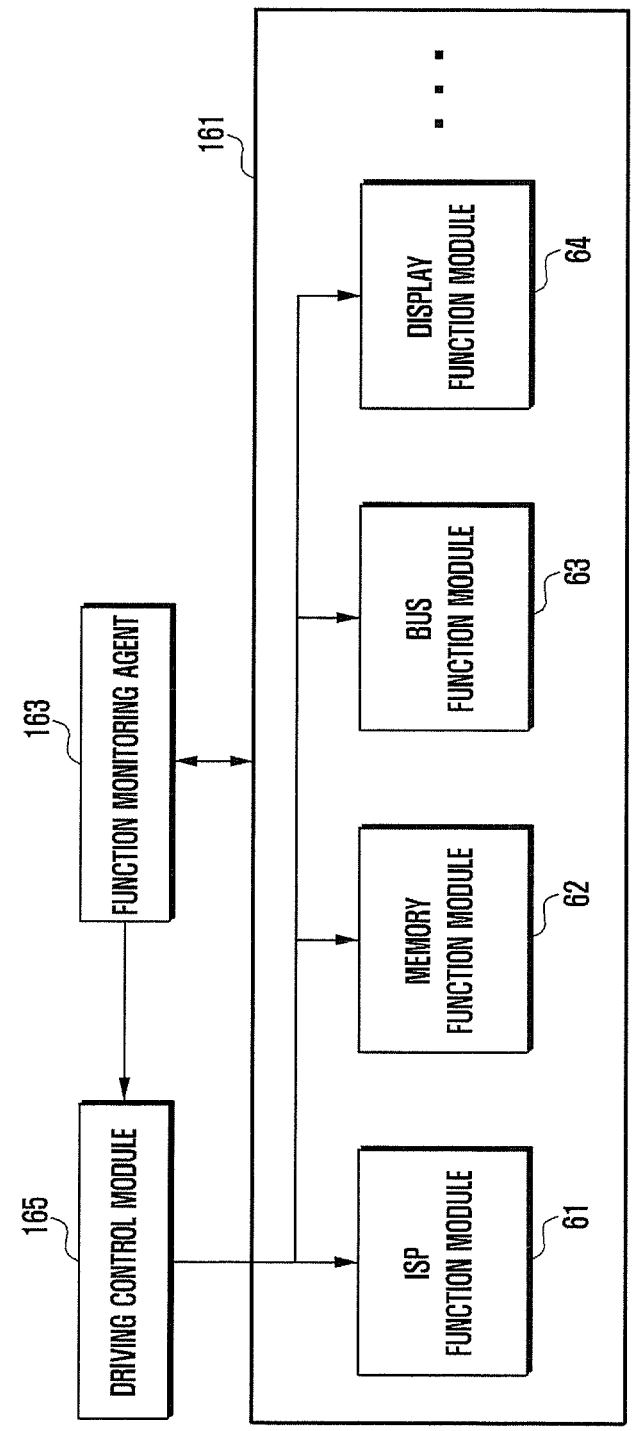
FIG. 4 is a block diagram illustrating a scheme of controlling a driving condition based on an operating state in a control unit in accordance with an embodiment of the present disclosure.

FIG. 4 is a block diagram illustrating a scheme of controlling a driving condition based on an operating state in a control unit in accordance with an embodiment of the present disclosure.

Referring to FIG. 4, the control unit 160 in this embodiment can include the driving control module 165 and the function monitoring agent 163 and further include the ISP function module 61, the memory function module 62, the bus function module 63 and the display function module 64.

Hereinafter, let's suppose that the ISP function module 61 is in an inactivated state and that the memory function module 62, the bus function module 63 and the display function module 64 are in activated states. Further, let's suppose that a driving condition, e.g., a voltage required is high in the order of the ISP function module 61, the display function module 64, the memory function module 62, and the bus function module 63.

Then the control unit 160 can recognize through the function monitoring agent 163 that the memory function module 62, the bus function module 63 and the display function module 64 are inactivated states and the ISP function module 61 is in an inactivated state. Therefore, the control unit 160 can adopt, as a driving condition, a voltage required for the display function module 64 which is the highest voltage from among all voltages required for the memory function module 62, the bus function module 63 and the display function module 64. In this case, the control unit 160 can adjust a voltage condition only, while using an operating frequency defined for the operation of the ISP function module 61. Therefore, by supplying electric power at a voltage for driving the display unit 140 which actually runs rather than at a voltage for the ISP function module 61, optimal power supply is realized. Additionally, the control unit 160 can further control a voltage according to the resolution of the display unit 140. For example, in case the display unit 140 is set to support the first resolution, the control unit 160 can supply electric power at a voltage defined for the first resolution. If the display unit 140 is set to support the second resolution which is lower than the first resolution, the control unit 160 can supply electric power at a lower voltage defined for the second resolution.

Meanwhile, if the ISP function module 61 is activated in response to an input event for driving the camera 170, the control unit 160 can supply electric power at a voltage required for the ISP function module 61. At this time, if the display unit 140 is set to display the screen having a suitable resolution for the camera 170, the control unit 160 can supply electric power at a voltage defined to support the above resolution. Additionally, if a voltage for driving the display unit 140 at the time of activating the camera 170 is greater than a voltage for the ISP function module 61, the control unit 160 can supply electric power at a voltage for driving the display unit 140. Alternatively, the control unit 160 can determine a voltage by considering totally the ISP function module 61, the display function module 64, and the other function modules.

Although the above description is focused on a voltage control based on activated function modules, this is exemplary only and not to be considered as a limitation. Alternatively, the control unit 160 can check and control an operating frequency of activated function modules only.

Figure 5:
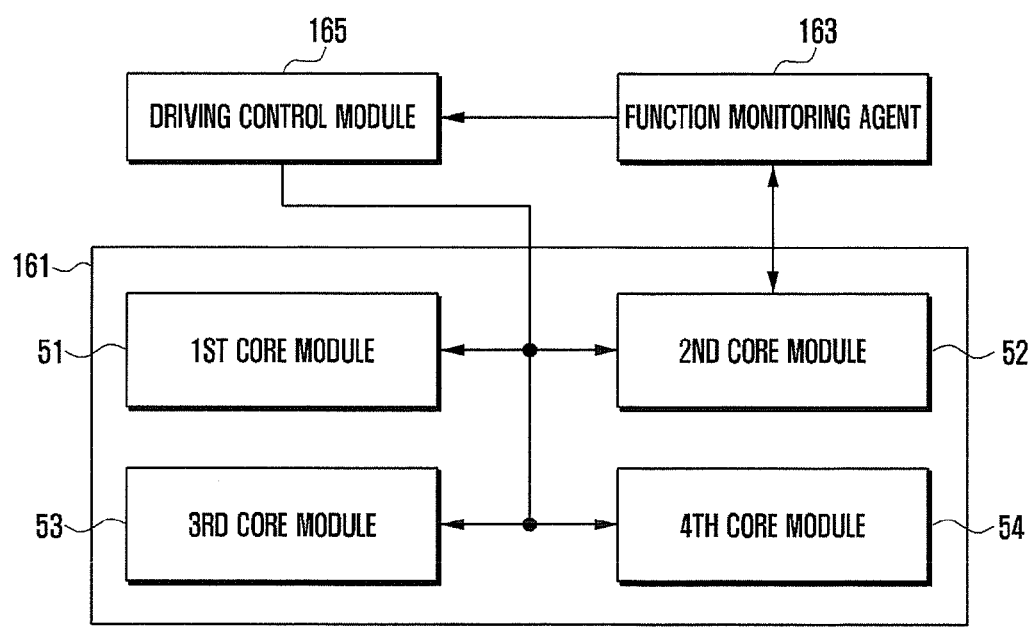
FIG. 5 is a block diagram illustrating a scheme of controlling a driving condition based on an operating state in a control unit in accordance with another embodiment of the present disclosure.

FIG. 5 is a block diagram illustrating a scheme of controlling a driving condition based on an operating state in a control unit in accordance with another embodiment of the present disclosure.

Referring to FIG. 5, the control unit 160 in this embodiment can include the driving control module 165, the function monitoring agent 163, and the function block 161 that is composed of the first core module 51, the second core module 52, the third core module 53 and the fourth core module 54. The first to fourth core modules 51 to 54 can operate using electric power distributed from the driving control module 165.

In the control unit 160, the function monitoring agent 163 can check an operating state of each core module 51, 52, 53 or 54 contained in the function block 161 and then apply a specific voltage and operating frequency required depending on the operating state. The core modules 51, 52, 53 and 54 can be processors for performing functions of the device 100. Based on the core modules 51, 52, 53 and 54, the function block 161 can perform a calculation process required for driving the device 100 and provide calculation results to necessary elements such as the display unit 140, the communication unit 110, the memory unit 150 and the camera 170. If any function is requested, at least parts of the core modules 51, 52, 53 and 54 can be selectively used. For example, in response to a request for invoking the first function, the first core module 51 can be activated. Similarly, in response to a request for invoking the first and second functions, the first, second and third core modules 51, 52 and 53 can be activated. Namely, the function block 161 can selectively activate at least parts of the core modules, depending on the type of and the number of functions requested. The first and second functions can be selected from various functions of the device 100, including a call function, a broadcast receiving function, a web access function, a file play function, a game function, a memo function, and the like.

In the above environments, if some of the core modules 51, 52, 53 and 54 are activated to support at least one function, the driving control module 165 can supply electric power at a specific voltage defined for the operation of the activated core modules. Alternatively, for the operation of the activated core modules, the driving control module 154 can apply a specific operating frequency as well as a specific voltage. Meanwhile, the driving control module 165 can select the DVFS extended table 153 according to the number of the activated core modules and then, based on the selected DVFS extended table 153, determine a specific operating frequency and a specific voltage.

By adjusting at least one of an operating frequency and a voltage on the basis of actually activated core modules, the driving control module 165 can provide electric power suitable for the operation of the device 100 at a proper operating frequency.

According to the trend of digital convergence, the above-discussed device 100 can essentially or selectively further include any other elements such as a short-range communication module, a wired or wireless communication interface, an Internet communication module, a digital broadcast receiving module, and the like. Meanwhile, as will be understood by those skilled in the art, some of the above-mentioned elements in the device 100 can be omitted or replaced with another.

Additionally, the mobile device according to embodiments disclosed herein may be applied to various types of mobile communication terminals such as a cellular phone, a smart phone, a tablet PC, a handheld PC, a PMP (portable multimedia player), a PDA (personal digital assistant), a notebook, a portable game console, and the like.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device for controlling a driving condition based on an operating state, the device comprising:

a function block including a plurality of function modules;

a function monitoring agent configured to identify one or more activated function modules among the function modules in the function block; and a driving control module configured to determine a driving condition required for an operation of the activated function modules, and based on the determined driving condition, drive the activated function modules, and further configured to adjust, in response to a change in operating states of the function modules, the driving condition.

2. The device of claim 1, wherein the driving control module is further configured to determine a highest voltage of all of voltages required by the activated function modules, and to supply electric power to the activated function modules at the highest voltage.

3. The device of claim 1, wherein the driving control module is further configured to calculate a specific voltage required by all of the activated function modules, and to supply electric power to the activated function modules at the specific voltage.

4. The device of claim 1, wherein the driving control module is further configured to check a resolution of a display unit, to detect a specific voltage defined depending on the resolution of the display, and to supply electric power to the activated function modules at the specific voltage.

5. The device of claim 1, wherein the driving control module is further configured to determine a highest operating frequency of all of operating frequencies required by the activated function modules, and to supply electric power to the activated function modules at the highest operating frequency.

6. The device of claim 1, further comprising:

a memory unit configured to store a dynamic voltage and frequency scaling (DVFS) extended table which is predefined for the operation of the activated function modules.

7. The device of claim 1, wherein the driving control module is further configured to recognize a further change in operating states of the function modules, the further change including an inactivation of the activated function module or an activation of an inactivated function module, and then to determine again the driving condition required for the operation of the activated function modules.

8. An electronic device for controlling a driving condition based on an operating state, the device comprising:

a function block including a plurality of function modules;

a function monitoring agent configured to identify one or more activated function modules among the plurality of function modules in the function block; and a driving control module configured to determine a driving condition required for operating the one or more identified activated function modules, and wherein the driving control module, based on the determined driving condition, is further configured to calculate a specific voltage required by a plurality of the one or more activated function modules for determining the driving condition.

9. The device of claim 8, wherein the driving control module is further configured to determine a highest voltage of all the voltages required by the one or more activated function modules, and to supply electric power to the one or more activated function modules at the highest voltage or at the specific voltage.

10. The device of claim 8, wherein the driving control module is further configured to supply electric power to the plurality of the one or more activated function modules at the specific voltage.

11. The device of claim 8, wherein the driving control module is further configured to check a resolution of a display unit, to detect a specific voltage defined depending on the resolution of the display unit, and to supply electric power to the plurality of the one or more activated function modules at the specific voltage.

12. The device of claim 8, wherein the driving control module is further configured to determine a highest operating frequency of all of operating frequencies required by the activated function modules, and to supply electric power to the activated function modules at the highest operating frequency.

13. The device of claim 8, further comprising:

a memory unit configured to store a dynamic voltage and frequency scaling (DVFS) extended table which is predefined for the operation of the activated function modules.

14. The device of claim 8, wherein the driving control module is further configured to recognize a further change in operating states of the function modules, the further change including an inactivation of the activated function module or an activation of an inactivated function module, and then to determine again the driving condition required for the operation of the activated function modules.

* * * * *